(12) United States Patent
Wakamatsu et al.

(10) Patent No.: US 8,052,414 B2
(45) Date of Patent: Nov. 8, 2011

(54) MOLD STRUCTURE USED TO PRODUCE DISCRETE TRACK MEDIUM, IMPRINTING METHOD, METHOD FOR PRODUCING DISCRETE TRACK MEDIUM, AND DISCRETE TRACK MEDIUM

(75) Inventors: Satoshi Wakamatsu, Kanagawa (JP); Tadashi Omatsu, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 31 days.

(21) Appl. No.: 12/652,909

(22) Filed: Jan. 6, 2010

(65) Prior Publication Data

US 2010/0173177 A1 Jul. 8, 2010

(30) Foreign Application Priority Data

Jan. 8, 2009 (JP) .................... 2009-002898

(51) Int. Cl.
*B29C 59/00* (2006.01)
*B28B 13/00* (2006.01)
(52) U.S. Cl. ............. 425/385; 425/436 R; 425/436 RM; 425/810; 264/293; 264/1.33

(58) Field of Classification Search .................. 425/385, 425/436 R, 436 RM, 810; 264/1.33, 293
See application file for complete search history.

(56) References Cited

U.S. PATENT DOCUMENTS

2008/0226946 A1* 9/2008 Moribe et al. ................ 428/810

FOREIGN PATENT DOCUMENTS

| JP | 2004-221465 | 8/2004 |
| JP | 2007-296683 | 11/2007 |
| JP | 2008-183731 | 8/2008 |

* cited by examiner

*Primary Examiner* — Maria Veronica Ewald
(74) *Attorney, Agent, or Firm* — Younh & Thompson

(57) ABSTRACT

To provide a mold structure used to produce a discrete track medium, including in a surface of the mold structure: a plurality of line pattern forming concave portions which are positioned so as to be adjacent and substantially parallel to each other; and a communicating concave portion which is positioned so as to intersect the line pattern forming concave portions and connects the line pattern forming concave portions.

4 Claims, 9 Drawing Sheets

MOLD STRUCTURE USED TO PRODUCE DISCRETE TRACK MEDIUM, IMPRINTING METHOD, METHOD FOR PRODUCING DISCRETE TRACK MEDIUM, AND DISCRETE TRACK MEDIUM

BACKGROUND OF THE INVENTION

1. Field of the Invention

The present invention relates to a mold structure used to produce a discrete track medium, an imprinting method, a method for producing a discrete track medium, and a discrete track medium.

2. Description of the Related Art

In recent years, more and more hard disk drives superior in terms of speed and cost have been installed as popular storage devices in portable machines such as cellular phones, compact acoustic devices and video cameras.

Along with the increase in the sharing of hard disk drives as storage devices installed in portable machines, there is a need to meet the demands for further compactness and increase in capacity, and techniques for improving recording density are being asked for.

To increase the recording density of the hard disk drives, methods for narrowing the spaces between data tracks in magnetic recording media or methods for narrowing the widths of magnetic heads have been conventionally employed.

However, the narrowing of the spaces between the data tracks causes effects of magnetism between adjacent tracks (crosstalk) and/or effects of demagnetization by heat fluctuation to be noticeable, so that the increase in recording density has been limited.

Also, the increase in surface recording density by narrowing the widths of the magnetic heads has been limited as well.

Accordingly, as a means to reduce noise caused by crosstalk, magnetic recording media called "discrete track media (DTM)" have been proposed. The discrete track media (DTM) reduce magnetic interference between adjacent tracks by having discrete structures in which nonmagnetic guard band areas are provided between the adjacent tracks so as to magnetically separate the tracks from each other.

As shown in FIG. 7, a conventional discrete track medium (DTM) includes a disc-shaped magnetic recording medium 204 having a circular hole 203 and a magnetic recording area 202 placed around the circular hole 203. The magnetic recording area 202 includes a servo pattern 201 placed so as to extend in a radial manner from an area near the circular hole 203 toward the periphery of the magnetic recording medium 204 and also includes a track pattern 200 provided in circles in a manner that is substantially concentric with the circular hole 203. This track pattern 200 has such a discrete structure as described above.

For production of the discrete track medium (DTM), an imprinting method (imprinting process) is used in which a desired pattern is transferred to an imprint resist layer formed over the surface of a magnetic recording medium, using a mold for forming a resist pattern (hereinafter also referred to as "mold" or "resist pattern forming mold") (refer to Japanese Patent Application Laid-Open (JP-A) No. 2004-221465).

Specifically, this imprinting method is a method for obtaining a desired magnetic recording medium, which includes applying as an imprint resist a thermoplastic resin, a photo-curable resin or a thermosetting resin onto a base material to be processed, closely attaching a mold, which has been processed to have a desired shape (pattern), to the applied resin under pressure, curing the resin by heating and subsequent cooling or by light irradiation, separating the mold from the resin so as to form on the resin a pattern which corresponds to the pattern formed on the mold, and subjecting the base material to patterning by dry or wet etching using this pattern as a mask.

A resist pattern forming mold used in such an imprinting method can be exemplified by a mold structure 300 including a plurality of line pattern forming concave portions 301 for forming the servo pattern 201 and the track pattern 200 (hereinafter, these patterns will also be referred to as "line patterns"), the line pattern forming concave portions 301 being provided on the side of an imprint surface corresponding to the magnetic recording area 202, as shown in FIG. 8A with an enlarged drawing for showing a part of the mold.

By pressing the mold structure 300 against an imprint resist layer and then separating (releasing) the mold structure, a pattern formation 320 composed of convex portions 310 as a line pattern which correspond to the line pattern forming concave portions 301 is obtained (see FIG. 8B).

As a method of separating the mold structure 300 from the imprint resist layer, there is a first separating method in which separation takes place from the peripheral side toward the center of the mold structure 300 as shown in FIG. 9A.

In FIG. 9A, first there is a state in which the mold structure 300 has been pressed and closely attached onto the imprint resist layer (shown by the color black in FIG. 9A), then separation takes place from the peripheral side toward the center of the mold structure 300 (this separation takes place in the order shown by the arrow direction in FIG. 9A). At this time, the direction of the separation is perpendicular to a line direction (pattern direction) of the track pattern 200.

Meanwhile, there is a second separating method in which separation takes place in one direction from the peripheral side of the mold structure 300 as shown in FIG. 9B.

In FIG. 9B, first there is a state in which the mold structure 300 has been pressed and closely attached onto the imprint resist layer (shown by the color black in FIG. 9B), then separation takes place from the periphery of the mold structure 300 on one side toward the periphery of the mold structure 300 on the opposite side (this separation takes place in the order shown by the arrow direction in FIG. 9B). At this time, there are places where the direction of the separation is perpendicular to the line direction of the track pattern 200, and also there are places where the direction of the separation is perpendicular to the line direction of the servo pattern 201.

Thus, when the mold structure 300 is separated (released) from the imprint resist layer, there are places where the direction of the separation of the mold structure 300 is perpendicular to the line direction of the convex portions 310 as a line pattern, and the convex portions 310 are pressurized from the direction of the separation of the mold structure 300, so that pattern defects such as collapse, detachment, missing, etc. of the convex portions easily arise, which is problematic.

In light of the foregoing, a pattern forming method has been disclosed as a means for reducing the occurrence of pattern defects, in which the separation (release) takes place, as the angle θ formed between the direction of separation and the line direction of a convex line pattern is set between −5° and 5° (refer to JP-A No. 2007-296683).

However, since the discrete track medium (DTM) has the servo pattern 201 extending in a radial manner and the concentrically formed track pattern 200 (see FIG. 7), there is such a problem that separation (release) with the angles θ between the direction of separation and the line directions of the patterns being all set between −5° and 5° is impossible (see FIGS. 9A and 9B).

Meanwhile, there has been disclosed a pattern forming method for reducing the occurrence of pattern defects by allowing the speed and angle at which a mold structure is released from an imprint resist layer to be variable (refer to JP-A No. 2008-183731).

However, even if the speed and the angle are optimized by making them variable, there is still such a problem that pattern defects such as collapse, detachment, missing, etc. of convex portions in pattern(s) easily arise depending upon the material for the resist layer, the thickness of the resist layer applied, the deign of pattern(s) (notably a convex line pattern with a high aspect ratio), etc.

Hence, satisfactory means for enabling imprinting on discrete track media (DTM) without causing pattern defects have not been obtained in reality.

BRIEF SUMMARY OF THE INVENTION

The present invention is aimed at solving the problems in related art and achieve the following object. An object of the present invention is to provide a mold structure used to produce a discrete track medium (hereinafter also referred to as "DTM mold structure") which does not cause pattern defects when separated (released) from an imprint resist layer; an imprinting method which improves transfer accuracy by using the DTM mold structure; a method for producing a discrete track medium (hereinafter also referred to as "DTM producing method"), which improves recording and reproducing properties; and a discrete track medium (hereinafter also referred to as "DTM").

Means for solving the problems are as follows.

<1> A mold structure used to produce a discrete track medium, including in a surface of the mold structure: a plurality of line pattern forming concave portions which are positioned so as to be adjacent and substantially parallel to each other; and a communicating concave portion which is positioned so as to intersect the line pattern forming concave portions and connects the line pattern forming concave portions.

<2> The mold structure according to <1>, wherein the communicating concave portion perpendicularly intersects one line pattern forming concave portion and another line pattern forming concave portion which are adjacent to each other, and connects these line pattern forming concave portions.

<3> The mold structure according to <1>, wherein the communicating concave portion connects at least one end of one line pattern forming concave portion with an end of another line pattern forming concave portion adjacent to the one line pattern forming concave portion, which faces the at least one end of the one line pattern forming concave portion.

<4> The mold structure according to any one of <1> to <3>, wherein X/Y is $1 \times 10^5$ or less and Z/Y is 5 or less, where X denotes the length of a line pattern forming concave portion with respect to a line direction from an end of the line pattern forming concave portion to an end of the communicating concave portion, the latter end being situated on the same side where the former end is situated, Y denotes the width of the line pattern forming concave portion, and Z denotes the depth of the line pattern forming concave portion.

<5> The mold structure according to any one of <1> to <3>, wherein the communicating concave portion is provided in a plurality of places, and a line pattern forming concave portion is positioned so as to be sandwiched between the communicating concave portions which are adjacent to each other with respect to a line direction, and wherein X/Y is $2 \times 10^5$ or less and Z/Y is 5 or less, where X denotes the length of the line pattern forming concave portion with respect to the line direction from an end of one communicating concave portion to an end of another communicating concave portion, the former end being situated on the same side where the another communicating concave portion is situated and the latter end being situated on the same side where the one communicating concave portion is situated, Y denotes the width of the line pattern forming concave portion, and Z denotes the depth of the line pattern forming concave portion.

<6> An imprinting method including: pressing the mold structure according to any one of <1> to <5> against an imprint resist layer made of an imprint resist composition and formed over a substrate, and then separating the mold structure from the imprint resist layer so as to transfer to the imprint resist layer a concavo-convex pattern which includes a line pattern composed of convex portions corresponding to the line pattern forming concave portions, with a concavo-convex structure of the mold structure serving as a template.

<7> The imprinting method according to <6>, wherein an aspect ratio, represented by Z'/Y,' satisfies the relationship $Z'/Y' \leq 5$, where Y' denotes the width of a convex portion in the line pattern, and Z' denotes the height of the convex portion.

<8> The imprinting method according to <6> or <7>, wherein X' and Y' satisfy the relationship $X'/Y' \leq 2 \times 10^5$, where X' denotes the length of a convex portion in the line pattern with respect to a line direction, and Y' denotes the width of the convex portion, and wherein the number of defects in the line pattern occupies 1% or less of the number of all the convex portions formed in the line pattern.

<9> A method for producing a discrete track medium, including: pressing the mold structure according to any one of <1> to <5> against an imprint resist layer made of an imprint resist composition and formed over a substrate of a discrete track medium, and then separating the mold structure from the imprint resist layer so as to transfer to the imprint resist layer a concavo-convex pattern which includes a line pattern corresponding to line pattern forming concave portions, with a concavo-convex structure of the mold structure serving as a template; etching a magnetic layer formed on a surface of the substrate of the discrete track medium, using as a mask the imprint resist layer to which the concavo-convex pattern has been transferred, so as to form data area magnetic patterned portions and servo area magnetic patterned portions at the magnetic layer which are respectively based upon the patterned shapes of data area concavo-convex portions and servo area concavo-convex portions formed on the mold structure; and filling concave portions, formed in the magnetic layer, with a nonmagnetic material so as to form nonmagnetic patterned portions.

<10> A discrete track medium obtained by the method according to <9>.

According to the present invention, it is possible to solve the problems in related art and achieve the object of providing a DTM mold structure which does not cause pattern defects when separated (released) from an imprint resist layer; an imprinting method which improves transfer accuracy by using the DTM mold structure; a DTM producing method which improves recording and reproducing properties; and a DTM.

BRIEF DESCRIPTION OF THE DRAWINGS

FIGS. 5B-1 to 5B-4 are cross-sectional views together showing the method for producing a DTM mold structure of the present invention.

DETAILED DESCRIPTION OF THE INVENTION

Figure 1A:
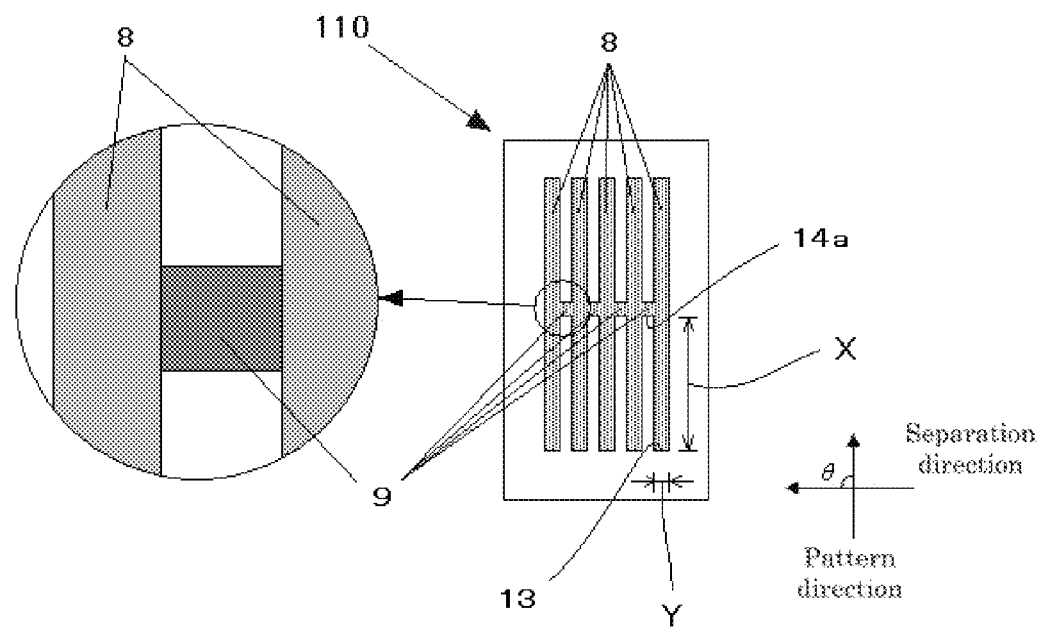
FIG. 1A is a schematic drawing showing a first embodiment of a mold structure of the present invention.

Mold Structure Used to Produce Discrete Track Medium

A mold structure used to produce a discrete track medium (hereinafter also referred to as "DTM mold structure" or "mold structure") according to the present invention includes concave portions for forming line patterns (hereinafter also referred to as "line pattern forming concave portions"), and communicating concave portions.

In the present specification, the term DTM (discrete track medium/media) means magnetic recording medium/media having discrete structure(s).

The mold structure includes a base plate (master) having a surface which is substantially circular as a whole. With this surface serving as an imprint surface, a servo pattern and a track pattern are formed on imprint targets of the surface.

—Line Pattern Forming Concave Portion—

The line pattern forming concave portions are composed of a plurality of concave grooves and formed in the surface of the base plate (original plate) of the mold structure such that adjacent concave grooves are positioned substantially parallel to each other.

—Communicating Concave Portion—

The communicating concave portions are positioned so as to intersect the line pattern forming concave portions adjacent to each other, and are placed so as to connect the line pattern forming concave portions.

The direction in which the communicating concave portions intersect and connect the adjacent line pattern forming concave portions is not particularly limited and may be suitably selected according to the purpose; however, it is desirable that the communicating concave portions perpendicularly intersect and connect the adjacent line pattern forming concave portions.

When the communicating concave portions are placed so as to perpendicularly intersect and connect the adjacent line pattern forming concave portions, a convex line pattern to be formed on an object as an imprint target can be supported by a convex pattern also to be formed by transfer of the communicating concave portions, and thus the occurrence of pattern defects, especially ones caused when the mold structure is separated from the object in a direction perpendicular to the line pattern, can be reduced.

Places where the communicating concave portions intersect and connect the line pattern forming concave portions are not particularly limited and may be suitably selected according to the purpose. For example, the communicating concave portions may intersect and connect the line pattern forming concave portions in any of the following manners.

(1) A communicating concave portion connects an intermediate portion of one line pattern forming concave portion with an intermediate portion of another line pattern forming concave portion adjacent to the one line pattern forming concave portion, the former intermediate portion and the latter intermediate portion facing each other.

(2) Communicating concave portion(s) connect(s) at least one end of one line pattern forming concave portion with an end of another line pattern forming concave portion adjacent to the one line pattern forming concave portion, the at least one end and the end facing each other.

(3) Communicating concave portions connect line pattern forming concave portions in a manner that is a combination of (1) and (2).

In terms of reducing the occurrence of pattern defects, (1) is desirable, (2) is more desirable and (3) is most desirable.

Examples of mold structures each including such line pattern forming concave portions and communicating concave portions as described above will be explained with reference to the drawings.

FIG. 1A is a schematic drawing showing a first embodiment of the mold structure. In FIG. 1A, a part of a mold structure 110 is shown in an enlarged manner to partially show a concavo-convex pattern for forming any of a track pattern and a servo pattern.

This mold structure 110 is provided with a plurality of line pattern forming concave portions 8 and a plurality of communicating concave portions 9. A communicating concave portion 9 is placed so as to connect an intermediate portion of one line pattern forming concave portion 8 with an intermediate portion of another line pattern forming concave portion 8 adjacent to the one line pattern forming concave portion 8, the former intermediate portion and the latter intermediate portion facing each other.

Figure 1B:
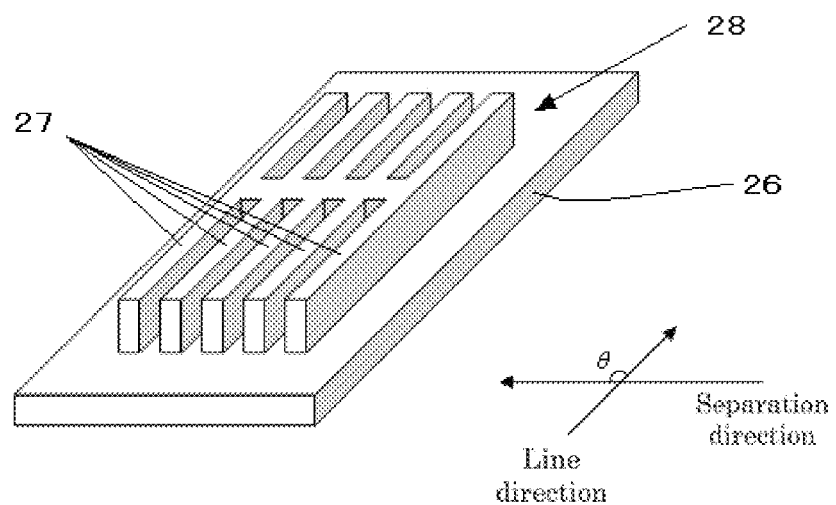
FIG. 1B is a schematic drawing showing a concavo-convex pattern of a resist layer, formed by imprinting using the mold structure shown in FIG. 1A.

When the after-mentioned imprinting is carried out using this mold structure, a concavo-convex pattern 28 including a convex line pattern 27 as shown in FIG. 1B can be formed at an imprint resist layer as an imprint target placed over a base material layer 26.

The enlarged display part in FIG. 1A shows areas of line pattern forming concave portions 8 and an area of a communicating concave portion 9. These areas are connected together to form one groove.

Figure 2A:
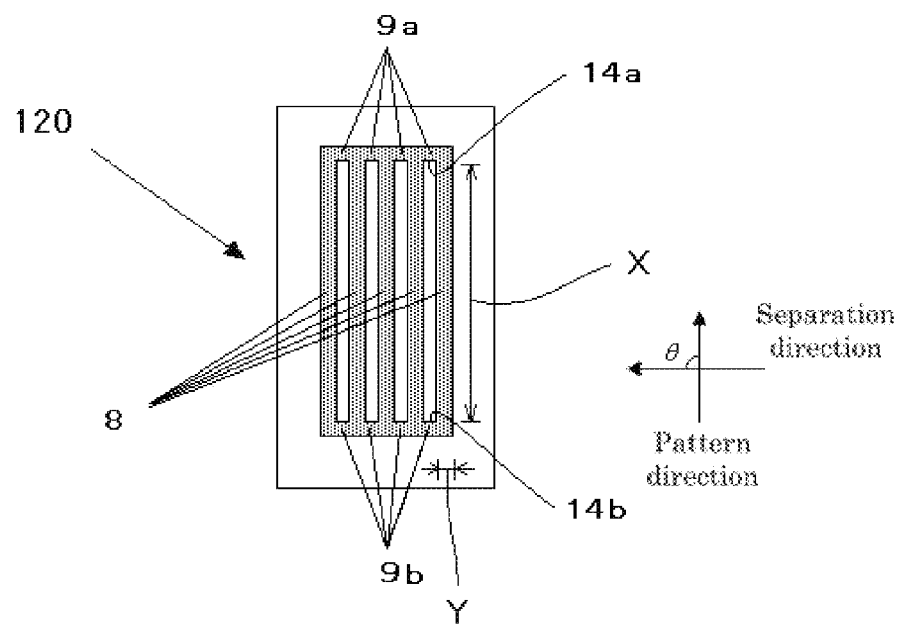
FIG. 2A is a schematic drawing showing a second embodiment of a mold structure of the present invention.

FIG. 2A is a schematic drawing showing a second embodiment of the mold structure. In FIG. 2A, a part of a mold structure 120 is shown in an enlarged manner to partially show a concavo-convex pattern for forming any of a track pattern and a servo pattern.

This mold structure 120 is provided with a plurality of line pattern forming concave portions 8 and a plurality of communicating concave portions 9a and 9b. A communicating concave portion 9a and a communicating concave portion 9b are placed so as to connect ends of one line pattern forming concave portion 8 with ends of another line pattern forming concave portion 8 adjacent to the one line pattern forming concave portion 8, the former ends and the latter ends respectively facing each other.

Figure 2B:
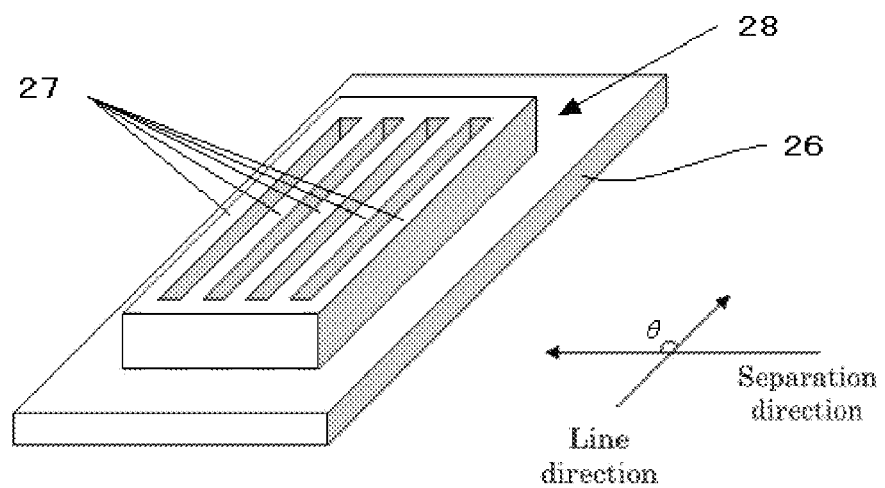
FIG. 2B is a schematic drawing showing a concavo-convex pattern of a resist layer, formed by imprinting using the mold structure shown in FIG. 2A.

When the after-mentioned imprinting is carried out using this mold structure, a concavo-convex pattern 28 including a convex line pattern 27 as shown in FIG. 2B can be formed at an imprint resist layer as an imprint target placed over the base material layer 26.

Figure 3A:
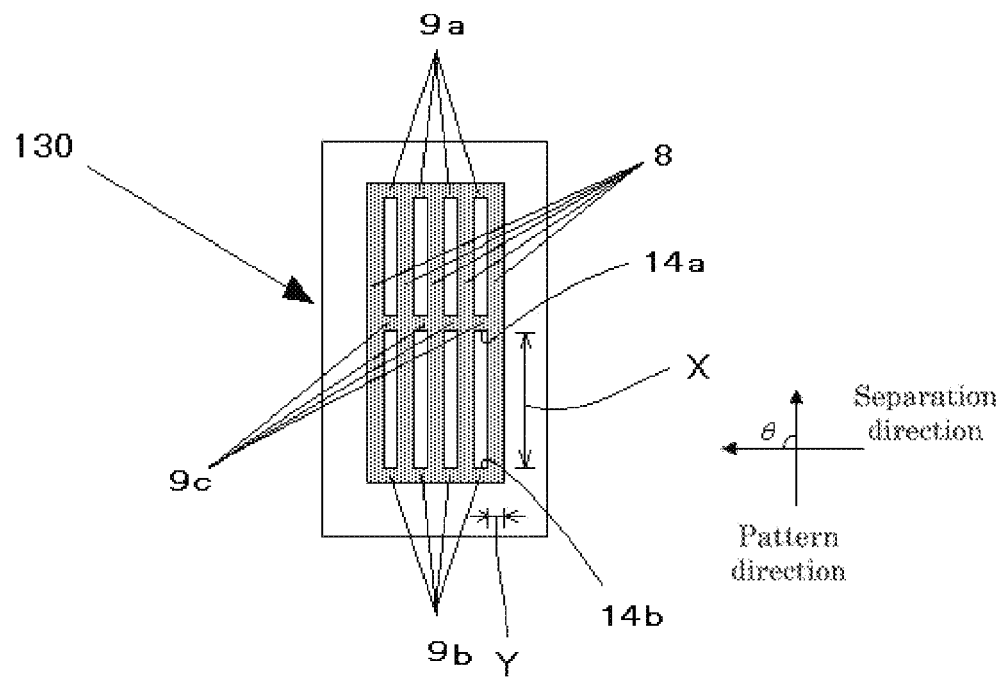
FIG. 3A is a schematic drawing showing a third embodiment of a mold structure of the present invention.

FIG. 3A is a schematic drawing showing a third embodiment of the mold structure. In FIG. 3A, a part of a mold structure 130 is shown in an enlarged manner to partially show a concavo-convex pattern for forming any of a track pattern and a servo pattern.

This mold structure 130 is provided with a plurality of line pattern forming concave portions 8 and a plurality of communicating concave portions 9a, 9b and 9c. A communicating concave portion 9c is placed so as to connect an intermediate portion of one line pattern forming concave portion 8 with an intermediate portion of another line pattern forming concave portion 8 adjacent to the one line pattern forming concave portion 8, the former intermediate portion and the latter intermediate portion facing each other; and a communicating concave portion 9a and a communicating concave portion 9b are placed so as to connect ends of the one line pattern forming concave portion 8 with ends of the other line pattern forming concave portion 8, the former ends and the latter ends respectively facing each other.

Figure 3B:
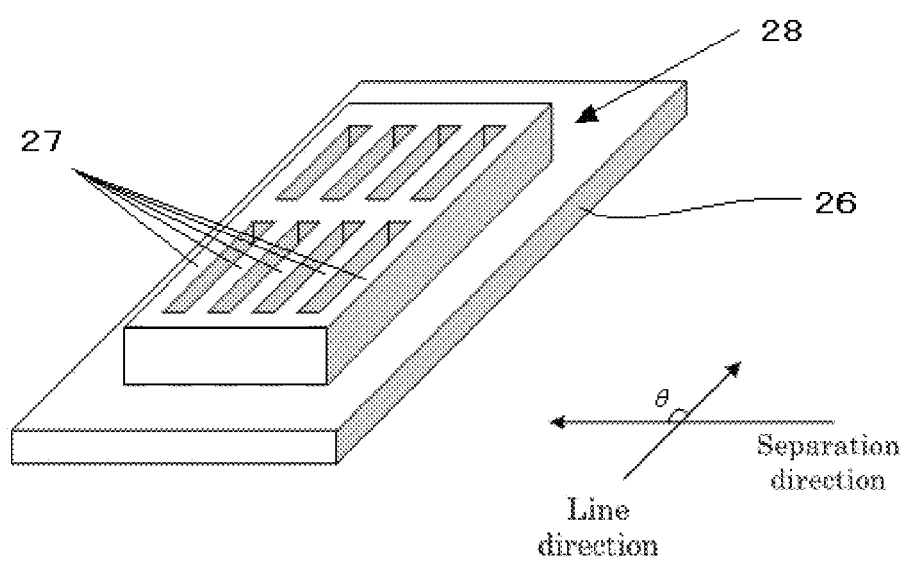
FIG. 3B is a schematic drawing showing a concavo-convex pattern of a resist layer, formed by imprinting using the mold structure shown in FIG. 3A.

When the after-mentioned imprinting is carried out using this mold structure, a concavo-convex pattern 28 including a convex line pattern 27 shown in FIG. 3B can be formed at an imprint resist layer as an imprint target placed over the base material layer 26.

The patterned shapes of these mold structures are not particularly limited but are preferably as follows.

In the case where a communicating concave portion 9 is not placed at an end 13 of a line pattern forming concave portion 8, X/Y is preferably $1 \times 10^5$ or less and Z/Y is preferably 5 or less, where X denotes the length of the line pattern forming concave portion 8 with respect to a line direction (pattern direction) from the end 13 thereof to an end 14a of a communicating concave portion 9, the end 14a being situated on the same side where the end 13 is situated (see FIG. 1A), Y denotes the width of the line pattern forming concave portion 8, and Z denotes the depth of the line pattern forming concave portion 8.

In the case where communicating concave portions 9 are placed at ends of a line pattern forming concave portion 8, and the line pattern forming concave portion 8 is positioned so as to be sandwiched between the communicating concave portions 9 (e.g. between the communicating concave portions 9a and 9b as in FIG. 2A or between the communicating concave portions 9b and 9c as in FIG. 3A) which are adjacent to each other with respect to the line direction (pattern direction), X/Y is preferably $2 \times 10^5$ or less and Z/Y is preferably 5 or less, where X denotes the length of the line pattern forming concave portion 8 with respect to the line direction (pattern direction) from an end 14a of one communicating concave portion 9 to an end 14b of another communicating concave portion 9, the end 14a being situated on the same side where the other communicating concave portion 9 is situated and the end 14b being situated on the same side where the one communicating concave portion 9 is situated (see FIGS. 2A and 3A), Y denotes the width of the line pattern forming concave portion 8, and Z denotes the depth of the line pattern forming concave portion 8.

When X/Y is $2 \times 10^5$ or less and Z/Y is 5 or less in these cases, concavo-convex patterns with favorable aspect ratios and with fewer pattern defects can be formed at imprint targets.

The structure of a mold structure with such line pattern forming concave portions and communicating concave portions as described above will be explained.

Figure 4:
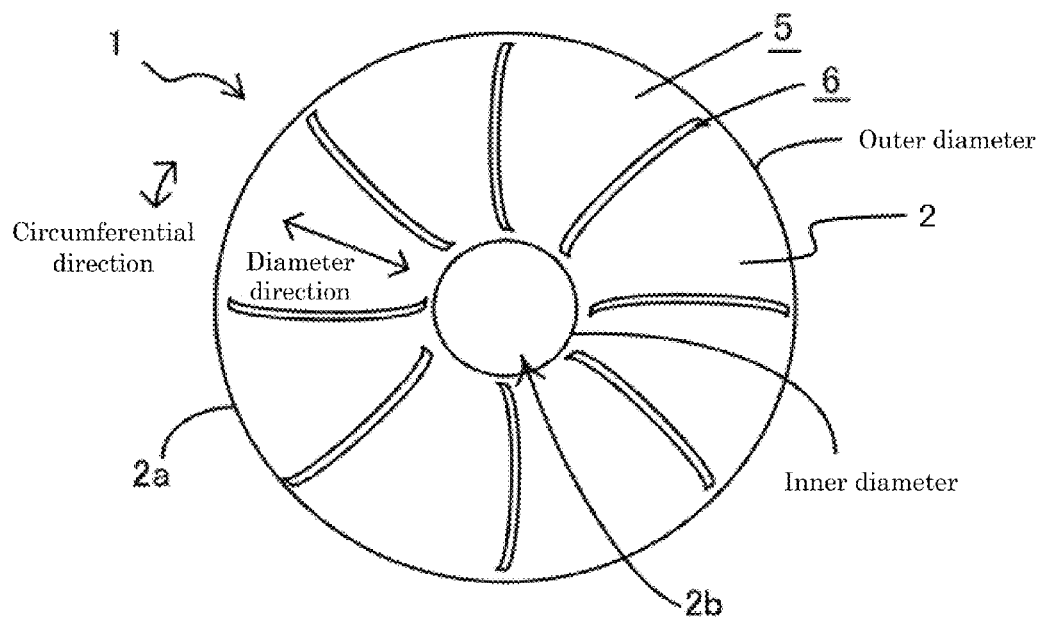
FIG. 4 is a drawing schematically showing the structure of a DTM mold structure of the present invention.

FIG. 4 is a drawing schematically showing the structure of a mold structure. As shown in FIG. 4, a mold structure 1 includes at least a base plate 2 in the form of a circular plate; concavo-convex portions 3B provided in areas 5 for forming a track pattern (hereinafter referred to as "track pattern forming areas 5") and formed by concentrically arranging a plurality of convex portions at predetermined intervals on a surface 2a of the base late 2; and concavo-convex portions 3B provided in areas 6 for forming a servo pattern (hereinafter referred to as "servo pattern forming areas 6") and formed by arranging a plurality of convex portions at predetermined intervals in a radius direction in the shape of arcs on the surface 2a. Further, the mold structure 1 may, if necessary, include other member(s).

As shown in FIG. 4, the servo pattern forming areas 6 are formed at approximately equal intervals with respect to a circumferential direction in such a manner as to separate the track pattern forming areas 5 from one another.

The track pattern forming areas 5 and the servo pattern forming areas 6 are provided with the above-mentioned line pattern forming concave portions and the above-mentioned communicating concave portions for forming a track pattern and a servo pattern (line patterns).

Note that provision of a hole 2b in the mold structure 1 may be omitted.

<Method for Producing Mold Structure>

The following explains an example of a method for producing a mold structure of the present invention. It should, however, be noted that a mold structure according to the present invention may be produced by a method other than the following method.

—Production of Original Master—

Figures 1, 5A:
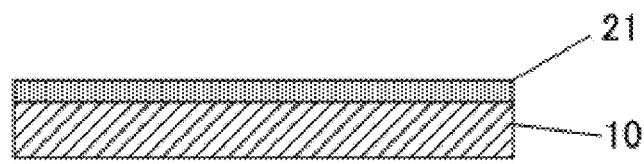
FIGS. 5A-1 to 5A-5 are cross-sectional views together showing a method for producing a DTM mold structure of the present invention.
Figures 2, 5A:
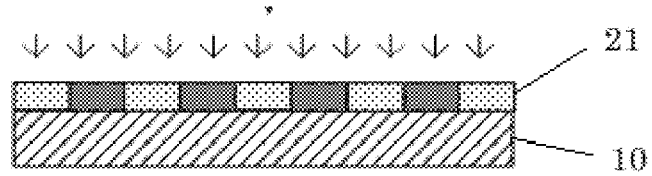
Figures 3, 5A:
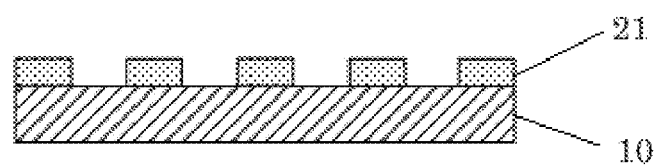
Figures 4, 5A:
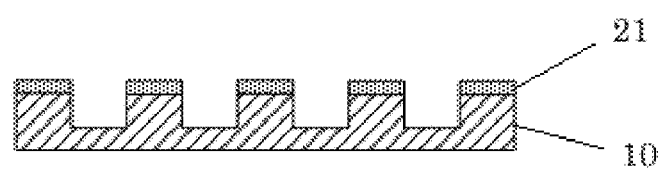
Figures 5, 5A:
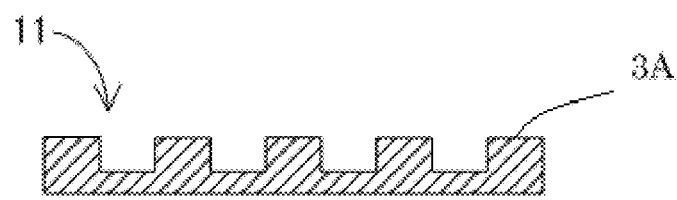

FIGS. 5A-1 to 5A-5 and 5B-1 to 5B-4 are cross-sectional views together showing a method for producing the mold structure 1. First of all, as shown in FIGS. 5A-1 to 5A-5, a photoresist solution containing a novolac-based resin, acrylic resin, etc. is applied onto a Si base material 10 by spin coating or the like so as to form a photoresist layer 21 on the Si base material 10.

Thereafter, while rotating the Si base material 10 with the photoresist layer 21, the photoresist layer 21 is irradiated with laser light (or an electron beam) modulated correspondingly to a predetermined pattern to be formed on a discrete track medium, such that the entire surface of the photoresist layer is exposed correspondingly to the predetermined pattern including a track pattern and a servo pattern.

Afterward, the photoresist layer 21 is developed, the exposed parts are removed, then the Si base material 10 is selectively etched by RIE, etc. with the pattern of the photoresist layer 21, formed after the removal, serving as a mask, and an original master 11 having concavo-convex portions 3A which include line pattern forming concave portions and communicating concave portions is thus obtained.

Examples of the method for producing a mold structure using the original master 11 include plating and nanoimprinting.

The mold structure may be produced by plating in the following manner.

First, a conductive layer (not shown) is formed on the surface of the original master 11.

Generally, vacuum deposition (sputtering, vapor deposition, etc.), electroless plating or the like can be employed to form the conductive layer.

As the material for the conductive layer, a metal or alloy which contains at least one element selected from Ni, Cr, W, Ta, Fe and Co can be used, with preference being given to Ni, Co, FeCo alloy, etc. Also, a nonmetallic material exhibiting conductivity, such as TiO, can be used as the material for the conductive layer.

The conductive layer preferably has a thickness of 5 nm to 30 nm, more preferably 10 nm to 25 nm.

Over the original master 11 with the conductive layer formed thereon, a metal material and an alloy material are deposited by plating to a predetermined thickness, and then the materials deposited by plating are separated from the original master 11 to thereby form a mold structure.

Here, the materials deposited by plating to constitute the mold structure can be selected from Ni, Cr, FeCo alloy, etc., with particular preference being given to Ni.

It should be noted that the mold structure 1 may be produced by replication, using the above-mentioned mold structure as the original master 11.

Figures 1, 5B:
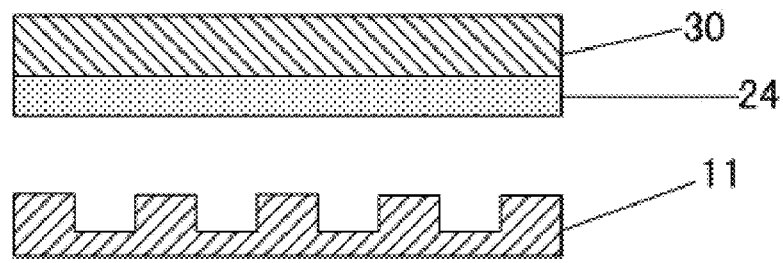
Figures 2, 5B:
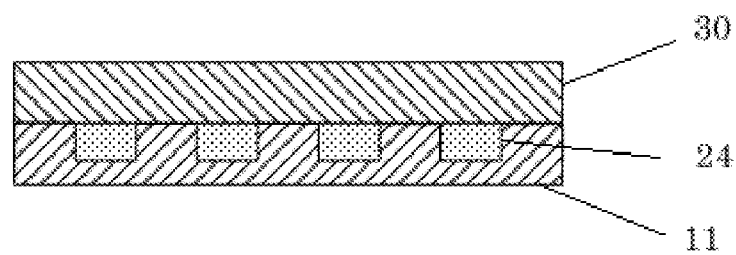
Figures 3, 5B:
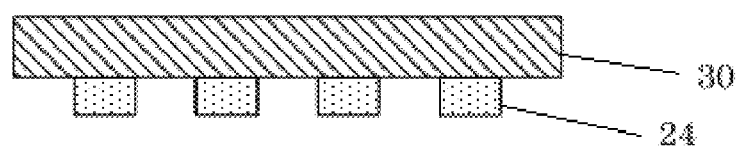
Figures 4, 5B:
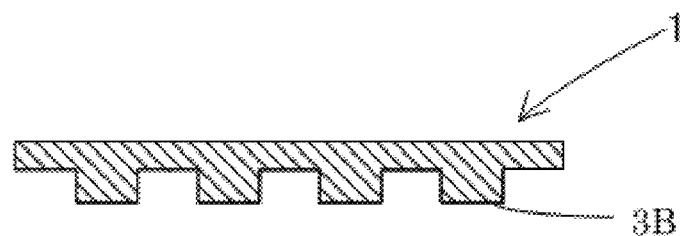

When the original master 11 is, as shown in FIGS. 5B-1 to 5B-4, pressed against an imprint resist layer 24 formed on one surface of a base plate 30 by applying an imprint resist solution containing any one selected from a thermoplastic resin, a photocurable resin and a thermosetting resin, and if a thermoplastic resin is selected, the temperature in the system for producing the mold structure 1 by replication is kept in the vicinity of the glass transition temperature (Tg) of the imprint resist solution, and the temperature of the imprint resist layer 24 becomes lower than the glass transition temperature of the imprint resist solution after the transfer, thereby curing the thermoplastic resin. If a photocurable resin is selected, the photocurable resin is cured by UV irradiation; if a thermosetting resin is selected, the thermosetting resin is cured by heating. Upon separation of the original master 11, the pattern composed of convex portions, formed on the original master 11, is transferred to the imprint resist layer 24.

Next, the base plate 30 is dry-etched using, as a mask, the imprint resist layer 24 to which the pattern has been transferred, and concavo-convex portions 3B based upon the shape of the concavo-convex pattern of the imprint resist layer 24 are thus formed on the mold structure 1.

The dry etching is not particularly limited as long as it enables a concavo-convex shape to be formed on the base plate 30, and the dry etching may be suitably selected according to the purpose. Examples thereof include ion milling, reactive ion etching (RIE) and sputter etching, with particular preference being given to ion milling and reactive ion etching (RIE).

The ion milling, also called "ion beam etching", is a method of introducing an inactive gas such as argon into an ion source so as to generate ions, then accelerating the ions through a grid and making the ions collide with a sample plate so as to etch the sample plate. Examples of the ion source include a Kaufman ion source, a high-frequency ion source, an electron bombardment ion source, a duoplasmatron ion source, a Freeman ion source and an ECR (electron cyclotron resonance) ion source.

Argon gas can be used as a process gas in the ion beam etching, and fluorine-based gas can be used as an etchant in the RIE.

Here, the material for the base plate 30 is not particularly limited as long as it transmits light and has such strength as can function as the mold structure 1, and the material may be suitably selected according to the purpose. Examples thereof include quartz ($SiO_2$) and organic resins (PET, PEN, polycarbonates, low-melting-point fluorine resins).

The specific meaning of the expression "transmits light" is that when light is made to enter the other surface of the base plate 30 so as to exit from the one surface thereof where the imprint resist layer 24 is formed, the imprint resist solution sufficiently cures, and that the light transmittance with respect to light having a wavelength of 200 nm or greater and advancing from the other surface toward the one surface is 50% or more.

The specific meaning of the expression "has such strength as can function as the mold structure" is that when the original master is pressed under an average surface pressure of 1 $kgf/cm^2$ or greater against the imprint resist layer 24 formed on the base plate 30, the material is not damaged and can be separated from the original master.

(Imprinting Method)

An imprinting method of the present invention includes at least a transfer step that is a step of pressing the mold structure against an imprint resist layer made of an imprint resist composition and formed over a substrate, and then separating the mold structure from the imprint resist layer so as to transfer to the imprint resist layer a concavo-convex pattern which includes a line pattern composed of convex portions corresponding to the line pattern forming concave portions, with a concavo-convex structure of the mold structure serving as a template.

For the pressing of the mold structure against the imprint resist layer and the subsequent separation of the mold structure from the imprint resist layer, there is at least a step in which while a peripheral portion of the mold structure 1 is held and the back surface of the substrate is held by suction, the held portion of the mold structure 1 or the held portion of the substrate is relatively moved in the opposite direction to the direction of the pressing so as to separate the mold structure from the imprint resist layer.

When the angle formed between the separation direction in which the mold structure is separated from the imprint resist layer and the line direction of the line pattern is denoted by $\theta(°)$, it is desirable that $\theta$ satisfy the relationship $-5<\theta\leq5$, more desirably $-45\leq\theta\leq45$.

Imprinting with the mold structure makes it possible to form a concavo-convex pattern with few pattern defects even when $\theta$ satisfies the relationship $-90<\theta\leq90$.

The separation (release) time (which is the length of time of the pressing, spent before the mold structure is separated) is not particularly limited but is preferably one second or more, and more preferably three seconds or more.

Imprinting with the mold structure makes it possible to form a concavo-convex pattern with fewer pattern defects and thus improve the capability of producing DTM, when the separation (release) time is one second or more.

Regarding the line pattern composed of convex portions, which is formed at the resist layer, an aspect ratio, represented by Z'/Y,' preferably satisfies the relationship $Z'/Y' \leq 5$, where Y' denotes the width of a convex portion in the line pattern, and Z' denotes the height of the convex portion.

When the aspect ratio is greater than 5, there is a problem of pattern defects such as collapse, detachment, missing, etc. of the convex portions in the pattern.

Also regarding the line pattern composed of convex portions, which is formed at the resist layer, X' and Y' preferably satisfy the relationship $X'/Y' \leq 2 \times 10^5$, where X' denotes the length of a convex portion in the line pattern with respect to a line direction, and Y' denotes the width of the convex portion, and wherein the number of defects in the line pattern preferably occupies 1% or less of the number of all the convex portions formed in the line pattern.

Imprinting with the mold structure enables the number of defects in the line pattern to occupy 1% or less of the number of all the convex portions formed in the line pattern, even when X' and Y' satisfy the relationship $X'/Y' \leq 2 \times 10^5$, which is preferable in terms of improving the yield.

(Method for Producing Discrete Track Medium)

A method of the present invention for producing a discrete track medium (magnetic recording medium) includes a transfer step and a magnetic pattern forming step.

The following explains an example of this DTM producing method with reference to the drawings.

Figure 6A:
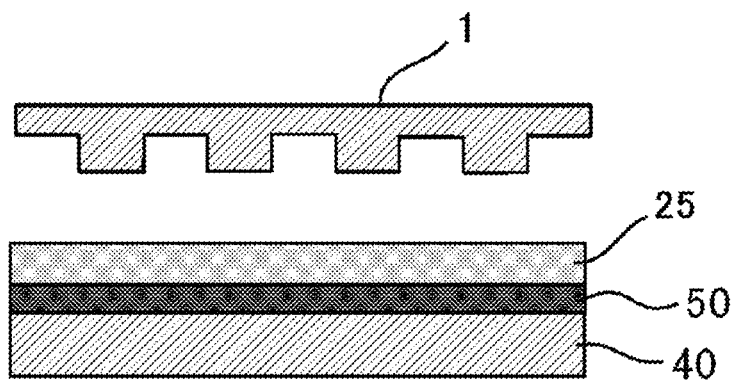
FIG. 6A is a cross-sectional view showing a method for producing a DTM (magnetic recording medium) of the present invention.

As shown in FIG. 6A, a magnetic layer 50 made of Fe, Fe alloy, Co, Co alloy or the like is formed on a substrate 40 made of aluminum, glass, silicon, quartz or the like so as to constitute a DTM (magnetic recording medium) intermediate member, and an imprint resist layer 25 obtained by applying an imprint resist solution which contains a thermoplastic resin, a photocurable resin or a thermosetting resin is formed on the magnetic layer 50 to constitute a resist layer-attached DTM (magnetic recording medium) intermediate member. Here, the mold structure 1 with a concavo-convex pattern (concavo-convex portions 3B) formed on its surface is pressed against the resist layer-attached DTM intermediate member and pressurized so as to transfer the concavo-convex pattern (concavo-convex portions 3B) to the imprint resist layer 25.

Figure 6B:
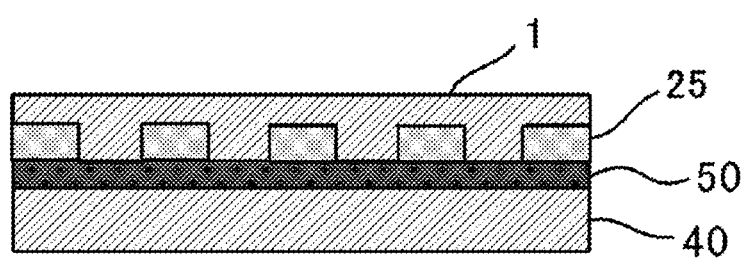
FIG. 6B is a cross-sectional view showing the method for producing a DTM (magnetic recording medium) of the present invention.

Next, when the mold structure 1 is pressed against the imprint resist layer 25 as shown in FIG. 6B, and if a thermoplastic resin is used for the imprint resist layer 25, the temperature in the system is kept in the vicinity of the glass transition temperature (Tg) of the imprint resist solution, and the temperature of the imprint resist layer 25 becomes lower than the glass transition temperature of the imprint resist solution after the transfer, thereby curing the thermoplastic resin. If a photocurable resin is used, the photocurable resin is cured by UV irradiation; if a thermosetting resin is used, the thermosetting resin is cured by heating.

Figure 6C:
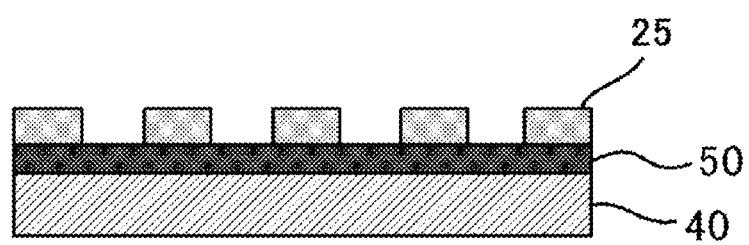
FIG. 6C is a cross-sectional view showing the method for producing a DTM (magnetic recording medium) of the present invention.

Subsequently, as shown in FIG. 6C, when the mold structure 1 is separated from the imprint resist layer 25, a concavo-convex pattern is formed at the imprint resist layer 25.

Figure 6D:
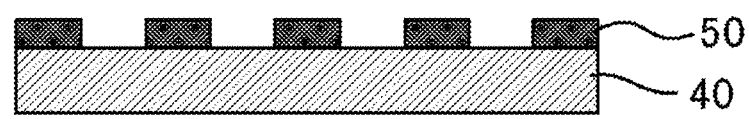
FIG. 6D is a cross-sectional view showing the method for producing a DTM (magnetic recording medium) of the present invention.

Next, as shown in FIG. 6D, the magnetic layer 50 is dry-etched using, as a mask, the imprint resist layer 25 to which the pattern of the concavo-convex portions 3B has been transferred, and a concavo-convex shape based upon the shape of the concavo-convex pattern of the imprint resist layer 25 is thus formed at the magnetic layer 50.

The dry etching is not particularly limited as long as it enables a concavo-convex shape to be formed at the magnetic layer, and the dry etching may be suitably selected according to the purpose. Examples thereof include ion milling, reactive ion etching (RIE) and sputter etching, with particular preference being given to ion milling and reactive ion etching (RIE).

The ion milling, also called "ion beam etching", is a method of introducing an inactive gas such as argon into an ion source so as to generate ions, then accelerating the ions through a grid and making the ions collide with a sample plate so as to etch the sample plate. Examples of the ion source include a Kaufman ion source, a high-frequency ion source, an electron bombardment ion source, a duoplasmatron ion source, a Freeman ion source and an ECR (electron cyclotron resonance) ion source.

Argon gas can be used as a process gas in the ion beam etching, and $CO+NH_3$, chlorine gas or the like can be used as an etchant in the RIE.

Figure 6E:
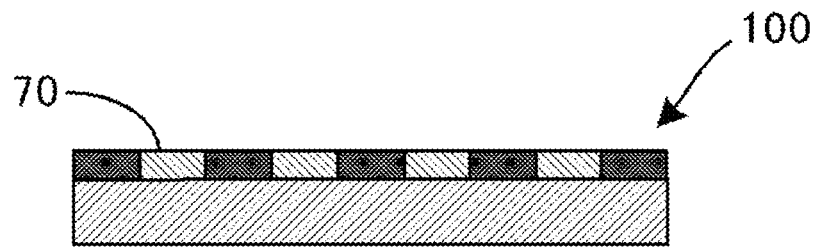
FIG. 6E is a cross-sectional view showing the method for producing a DTM (magnetic recording medium) of the present invention.
Figure 7:
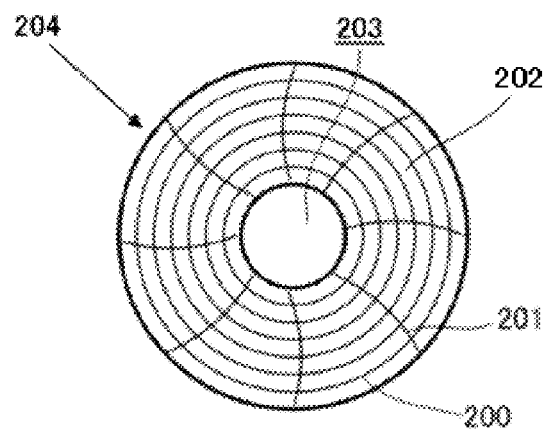
FIG. 7 is a drawing schematically showing the structure of a conventional DTM (magnetic recording medium).
Figure 8A:
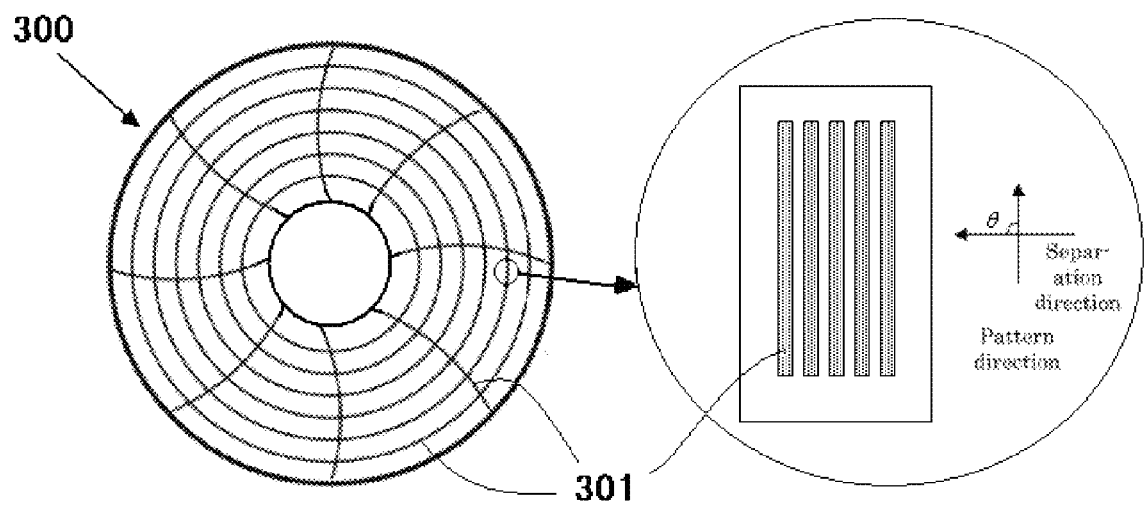
FIG. 8A is a schematic drawing showing a conventional mold structure.
Figure 8B:
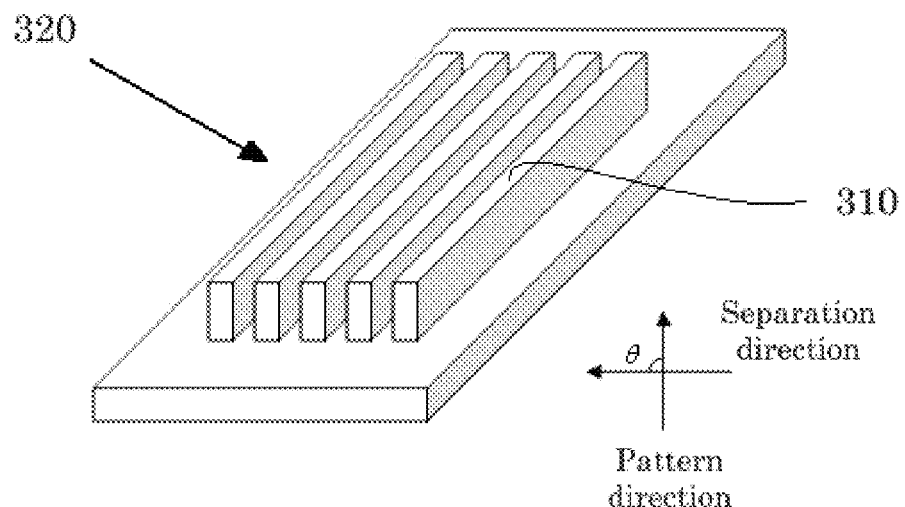
FIG. 8B is a schematic drawing showing a concavo-convex pattern of a resist layer, formed by imprinting using the conventional mold structure.
Figure 9A:
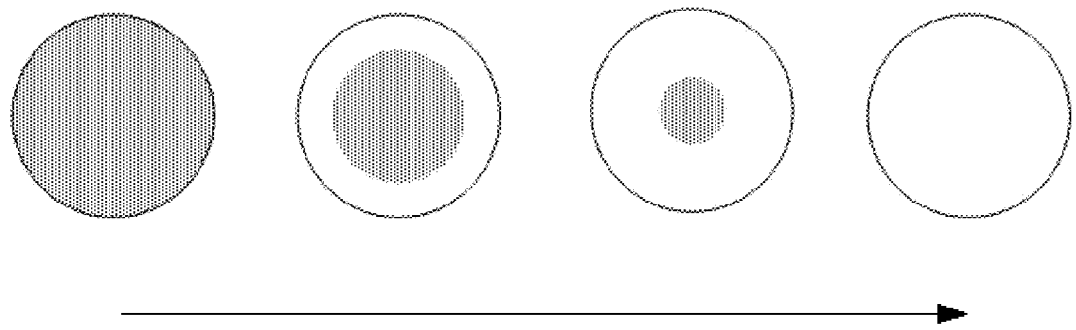
FIG. 9A is a schematic drawing showing a method of separating a mold structure from an imprint resist layer.
Figure 9B:
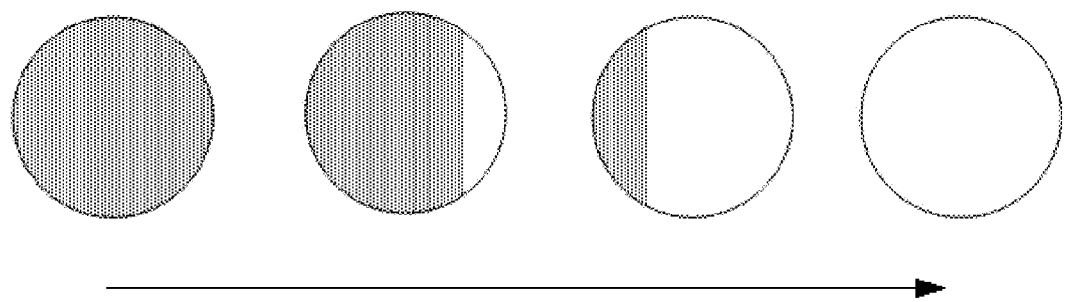
FIG. 9B is a schematic drawing showing another method of separating a mold structure from an imprint resist layer.

Next, as shown in FIG. 6E, concave portions formed in the magnetic layer are filled with a nonmagnetic material 70, the surface is flattened, then a protective film and/or the like are/is if necessary formed over the surface, and a DTM 100 can thus be obtained.

Examples of the nonmagnetic material include $SiO_2$, carbon and alumina; polymers such as polymethyl methacrylate (PMMA) and polystyrene (PS); and lubricating oil.

The protective film is preferably made of diamond-like carbon (DLC), sputtered carbon or the like, and a lubricant layer may be provided on the protective film.

(Discrete Track Medium)

A discrete track medium (magnetic recording medium) of the present invention is not particularly limited as long as it is produced by the DTM producing method, and the discrete track medium may be suitably selected according to the purpose.

EXAMPLES

The following explains Examples of the present invention. It should, however, be noted that the present invention is not confined to these Examples in any way.

Examples 1 and 2 and Comparative Example 1

Example 1

Production of DTM Mold Structure

First of all, a photoresist solution mainly composed of PMMA, etc. was applied onto a Si base material by spin coating so as to form a photoresist layer on the Si base material.

Thereafter, while rotating the Si base material with the photoresist layer, the photoresist layer was irradiated with an electron beam modulated correspondingly to a pattern to be formed on a DTM, such that the entire surface of the photoresist layer was exposed in a manner that corresponded to the pattern composed of a track pattern and a servo pattern, which included line pattern forming concave portions and communicating concave portions.

Afterward, the photoresist layer was developed, the exposed parts were removed, then the Si base material was selectively etched by RIE, etc. with the pattern of the photoresist layer, formed after the removal, serving as a mask, and an original master was thus obtained.

Here, regarding the communicating concave portions, two communicating concave portions were provided in relation to two adjacent line pattern forming concave portions, such that both ends (with respect to a line direction) of one line pattern forming concave portion and both ends (with respect to the line direction) of the other line pattern forming concave portion were connected in a direction perpendicular to the line direction, with the former both ends respectively facing the latter both ends (Communicating Method 1).

Also, the line pattern forming concave portions and the communicating concave portions were provided such that X, Y and Z were 10 mm, 100 nm and 100 nm respectively ($X/Y=1\times10^5$, $Z/Y=1$), where X denotes the length of a line pattern forming concave portion with respect to the line direction from an end of one communicating concave portion to an end of the other communicating concave portion, the former end being situated on the same side where the other communicating concave portion was situated and the latter end being situated on the same side where the one communicating concave portion was situated (in other words, the length of the line pattern forming concave portion where the communicating concave portions were not placed), Y denotes the width of the line pattern forming concave portion, and Z denotes the depth of the line pattern forming concave portion.

A quartz base plate whose one surface was covered with an imprint resist layer formed by applying an imprint resist solution which contained a photocurable resin was prepared. The original master was pressed against the imprint resist layer, and while doing so, UV light was applied from the quartz base plate side so as to transfer the pattern formed on the original master to the imprint resist layer.

Subsequently, the quartz base plate was dry-etched using, as a mask, the imprint resist layer to which the pattern had been transferred, and a concavo-convex shape based upon the shape of the concavo-convex pattern of the imprint resist layer was thus formed on the quartz base plate. By the above-mentioned process, a DTM mold structure was produced which was made of quartz, and in which a communicating concave portion connected an intermediate portion of one line pattern forming concave portion with an intermediate portion of another line pattern forming concave portion that was adjacent to the one line pattern forming concave portion, the former intermediate portion facing the latter intermediate portion.

—Measurement of Shape of DTM Mold Structure—

The length of a line pattern forming concave portion with respect to the line direction was measured using an optical microscope and an SEM (scanning electron microscope); as for the width and the depth thereof, a cross-sectional section thereof was cut out and it was observed using an SEM and a TEM (transmission electron microscope) so as to measure the width and the depth.

<Imprinting>

A photocurable acrylic imprint resist solution (PAK-01, manufactured by Toyo Gosei Co., Ltd.) was applied by spin coating onto a substrate to be imprinted, and an imprint resist layer was thus formed on the substrate.

The mold structure was placed facing the substrate with the imprint resist layer, then the patterned surface of the mold structure and the imprint resist layer formed on the substrate were closely attached to each other under a pressure of 1 MPa for 5 seconds as separation time (which is the length of time of the pressing, spent before the mold structure is separated) so as to transfer the pattern to the imprint resist layer, and subsequently UV light was applied (25 mJ/cm$^2$) for 10 seconds to harden the transferred pattern. Thereafter, the mold structure was separated from the substrate with the imprint resist layer, and a concavo-convex pattern was thus formed at the imprint resist layer on the substrate.

—Method of Evaluating Formability of Resist Pattern—

The concavo-convex pattern including a line pattern composed of convex portions, formed at the imprint resist layer, was measured for the aspect ratio and pattern defects in the following manner so as to evaluate the pattern formability.

—Measurement of Aspect Ratio—

A cross-sectional section of the substrate with the imprint resist layer was cut out and it was observed using an SEM (scanning electron microscope) and a TEM (transmission electron microscope) so as to measure the width and the height of a convex portion in the line pattern, and the aspect ratio was calculated from the width and the height.

—Measurement of Pattern Defects—

The line pattern was examined in a dark-field measurement using an optical microscope (with a magnification of 50 times to 1,500 times).

First, a 2 mm×2 mm view for the measurement was set with a magnification of 50 times. Next, the view for the measurement was scanned in the line direction so as to roughly check whether or not pattern defects existed. When there seemed to be pattern defects, an observation was conducted with the magnification being gradually increased, and the number of pattern defects was counted. A pattern defect was defined as a case where scattering light, not seen with a normal line pattern, that was caused by detachment, collapse, etc. of a convex portion in the line pattern was detected.

In the dark-field measurement, detection of pattern defects with respect to each convex portion in the line pattern was enabled by means of the scattering light. The number of convex portions present in the 2 mm×2 mm view for the measurement was $1\times10^4$, and the rate of defects was calculated from the number of defects detected in relation to the $1\times10^4$ convex portions serving as a population. The results are shown in Table 1 below.

<Production of DTM>

A magnetic layer was dry-etched using, as a mask, the imprint resist layer to which the concavo-convex pattern had been transferred, and a concavo-convex shape based upon the shape of the concavo-convex pattern of the imprint resist layer was thus formed at the magnetic layer. For the dry etching, ion milling using argon gas was employed.

Example 2

A DTM mold structure of Example 2 was produced in the same manner as in Example 1 except that, instead of Communicating Method 1, Communicating Method 2 was employed in which one communicating concave portion was provided in relation to two adjacent line pattern forming concave portions, such that one end (With respect to the line direction) of one line pattern forming concave portion and one end (with respect to the line direction) of the other line pattern forming concave portion were connected in a direction perpendicular to the line direction, with the former one end and the latter one end facing each other.

In Example 2, the length of a line pattern forming concave portion with respect to the line direction from an end of the line pattern forming concave portion to an end of the communicating concave portion, the latter end being situated on the same side where the former end was situated (in other words, the length of the line pattern forming concave portion where the communicating concave portion was not placed) is equivalent to the length X in Example 1.

Imprinting and production of a DTM were carried out in the same manner as in Example 1 except that this mold structure of Example 2 was used, then the formability of the resist pattern was evaluated. The results are shown in Table 1 below.

Comparative Example 1

A DTM mold structure of Comparative Example 1 was produced in the same manner as in Example 1 except that no communicating concave portion was provided.

In each Comparative Example, the length of a line pattern forming concave portion with respect to the line direction is equivalent to the length X in Example 1.

Imprinting and production of a DTM were carried out in the same manner as in Example 1 except that this mold structure of Comparative Example 1 was used, then the formability of the resist pattern was evaluated. The results are shown in Table 1 below.

Examples 3 and 4 and Comparative Example 2

Example 3

A DTM mold structure of Example 3 was produced in the same manner as in Example 1 except that the depth Z was changed from 100 nm to 500 nm.

Imprinting and production of a DTM were carried out in the same manner as in Example 1 except that this mold structure of Example 3 was used, then the formability of the resist pattern was evaluated. The results are shown in Table 1 below.

Example 4

A DTM mold structure of Example 4 was produced in the same manner as in Example 2 except that the depth Z was changed from 100 nm to 500 nm.

Imprinting and production of a DTM were carried out in the same manner as in Example 1 except that this mold structure of Example 4 was used, then the formability of the resist pattern was evaluated. The results are shown in Table 1 below.

Comparative Example 2

A DTM mold structure of Comparative Example 2 was produced in the same manner as in Comparative Example 1 except that the depth Z was changed from 100 nm to 500 nm.

Imprinting and production of a DTM were carried out in the same manner as in Example 1 except that this mold structure of Comparative Example 2 was used, then the formability of the resist pattern was evaluated. The results are shown in Table 1 below.

Example 5 and Comparative Example 3

Example 5

A DTM mold structure of Example 5 was produced in the same manner as in Example 2 except that the separation time was changed from five seconds to one second.

Imprinting and production of a DTM were carried out in the same manner as in Example 1 except that this mold structure of Example 5 was used, then the formability of the resist pattern was evaluated. The results are shown in Table 1 below.

Comparative Example 3

A DTM mold structure of Comparative Example 3 was produced in the same manner as in Comparative Example 1 except that the separation time was changed from five seconds to one second.

Imprinting and production of a DTM were carried out in the same manner as in Example 1 except that this mold structure of Comparative Example 3 was used, then the formability of the resist pattern was evaluated. The results are shown in Table 1 below.

Examples 6 and 7 and Comparative Example 4

Example 6

A DTM mold structure of Example 6 was produced in the same manner as in Example 1 except that the length X was changed from 10 mm to 10 µm.

Imprinting and production of a DTM were carried out in the same manner as in Example 1 except that this mold structure of Example 6 was used, then the formability of the resist pattern was evaluated. The results are shown in Table 1 below.

Example 7

A DTM mold structure of Example 7 was produced in the same manner as in Example 2 except that the length X was changed from 10 mm to 10 µm.

Imprinting and production of a DTM were carried out in the same manner as in Example 1 except that this mold structure of Example 7 was used, then the formability of the resist pattern was evaluated. The results are shown in Table 1 below.

Comparative Example 4

A DTM mold structure of Comparative Example 4 was produced in the same manner as in Comparative Example 1 except that the length X was changed from 10 mm to 10 µm.

Imprinting and production of a DTM were carried out in the same manner as in Example 1 except that this mold structure of Comparative Example 4 was used, then the formability of the resist pattern was evaluated. The results are shown in Table 1 below.

Examples 8 and 9 and Comparative Example 5

Example 8

A DTM mold structure of Example 8 was produced in the same manner as in Example 1 except that the length X was changed from 10 mm to 20 mm.

Imprinting and production of a DTM were carried out in the same manner as in Example 1 except that this mold structure of Example 8 was used, then the formability of the resist pattern was evaluated. The results are shown in Table 1 below.

Example 9

A DTM mold structure of Example 9 was produced in the same manner as in Example 2 except that the length X was changed from 10 mm to 20 mm.

Imprinting and production of a DTM were carried out in the same manner as in Example 1 except that this mold structure of Example 9 was used, then the formability of the resist pattern was evaluated. The results are shown in Table 1 below.

Comparative Example 5

A DTM mold structure of Comparative Example 5 was produced in the same manner as in Comparative Example 1 except that the length X was changed from 10 mm to 20 mm.

Imprinting and production of a DTM were carried out in the same manner as in Example 1 except that this mold structure of Comparative Example 5 was used, then the formability of the resist pattern was evaluated. The results are shown in Table 1 below.

Examples 10 and 11 and Comparative Example 6

Example 10

A DTM mold structure of Example 10 was produced in the same manner as in Example 1 except that the depth Z was changed from 10 mm to 30 mm.

Imprinting and production of a DTM were carried out in the same manner as in Example 1 except that this mold structure of Example 10 was used, then the formability of the resist pattern was evaluated. The results are shown in Table 1 below.

Example 11

A DTM mold structure of Example 11 was produced in the same manner as in Example 2 except that the length X was changed from 10 mm to 30 mm.

Imprinting and production of a DTM were carried out in the same manner as in Example 1 except that this mold structure of Example 11 was used, then the formability of the resist pattern was evaluated. The results are shown in Table 1 below.

Comparative Example 6

A DTM mold structure of Comparative Example 6 was produced in the same manner as in Comparative Example 1 except that the length X was changed from 10 mm to 30 mm.

Imprinting and production of a DTM were carried out in the same manner as in Example 1 except that this mold structure of Comparative Example 6 was used, then the formability of the resist pattern was evaluated. The results are shown in Table 1 below.

Examples 12 and 13 and Comparative Example 7

Example 12

A DTM mold structure of Example 12 was produced in the same manner as in Example 1 except that the depth Z was changed from 100 nm to 300 nm.

Imprinting and production of a DTM were carried out in the same manner as in Example 1 except that this mold structure of Example 12 was used, then the formability of the resist pattern was evaluated. The results are shown in Table 1 below.

Example 13

A DTM mold structure of Example 13 was produced in the same manner as in Example 2 except that the depth Z was changed from 100 nm to 300 nm.

Imprinting and production of a DTM were carried out in the same manner as in Example 1 except that this mold structure of Example 13 was used, then the formability of the resist pattern was evaluated. The results are shown in Table 1 below.

Comparative Example 7

A DTM mold structure of Comparative Example 7 was produced in the same manner as in Comparative Example 1 except that the depth Z was changed from 100 nm to 300 nm.

Imprinting and production of a DTM were carried out in the same manner as in Example 1 except that this mold structure of Comparative Example 7 was used, then the formability of the resist pattern was evaluated. The results are shown in Table 1 below.

Examples 14 and 15 and Comparative Example 8

Example 14

A DTM mold structure of Example 14 was produced in the same manner as in Example 1 except that the depth Z was changed from 100 nm to 600 nm.

Imprinting and production of a DTM were carried out in the same manner as in Example 1 except that this mold structure of Example 14 was used, then the formability of the resist pattern was evaluated. The results are shown in Table 1 below.

Example 15

A DTM mold structure of Example 15 was produced in the same manner as in Example 2 except that the depth Z was changed from 100 nm to 600 nm.

Imprinting and production of a DTM were carried out in the same manner as in Example 1 except that this mold structure of Example 15 was used, then the formability of the resist pattern was evaluated. The results are shown in Table 1 below.

Comparative Example 8

A DTM mold structure of Comparative Example 8 was produced in the same manner as in Comparative Example 1 except that the depth Z was changed from 100 nm to 600 nm.

Imprinting and production of a DTM were carried out in the same manner as in Example 1 except that this mold structure of Comparative Example 8 was used, then the formability of the resist pattern was evaluated. The results are shown in Table 1 below.

The results obtained in Examples 1 to 15 and Comparative Examples 1 to 8 are shown together in Table 1 below.

TABLE 1

| | Number of communicating concave portion(s) provided | Length X | Width Y | Depth Z | X/Y | Z/Y | Separation time | Rate of defects |
|---|---|---|---|---|---|---|---|---|
| Ex. 1 | Two | 10 mm | 100 nm | 100 nm | $1 \times 10^5$ | 1 | 5 sec | 0.48% |
| Ex. 2 | One | 10 mm | 100 nm | 100 nm | $1 \times 10^5$ | 1 | 5 sec | 0.76% |
| Comp. Ex. 1 | Not provided | 10 mm | 100 nm | 100 nm | $1 \times 10^5$ | 1 | 5 sec | 1.82% |
| Ex. 3 | Two | 10 mm | 100 nm | 500 nm | $1 \times 10^5$ | 5 | 5 sec | 0.71% |
| Ex. 4 | One | 10 mm | 100 nm | 500 nm | $1 \times 10^5$ | 5 | 5 sec | 0.91% |
| Comp. Ex. 2 | Not provided | 10 mm | 100 nm | 500 nm | $1 \times 10^5$ | 5 | 5 sec | 6.14% |
| Ex. 5 | One | 10 mm | 100 nm | 100 nm | $1 \times 10^5$ | 1 | 1 sec | 0.97% |

TABLE 1-continued

| | Number of communicating concave portion(s) provided | Length X | | Width Y | Depth Z | X/Y | Z/Y | Separation time | Rate of defects |
|---|---|---|---|---|---|---|---|---|---|
| Comp. Ex. 3 | Not provided | 10 | mm | 100 nm | 100 nm | $1 \times 10^5$ | 1 | 1 sec | 4.57% |
| Ex. 6 | Two | 10 | μm | 100 nm | 100 nm | $1 \times 10^2$ | 1 | 5 sec | 0.06% |
| Ex. 7 | One | 10 | μm | 100 nm | 100 nm | $1 \times 10^2$ | 1 | 5 sec | 0.18% |
| Comp. Ex. 4 | Not provided | 10 | μm | 100 nm | 100 nm | $1 \times 10^2$ | 1 | 5 sec | 0.92% |
| Ex. 8 | Two | 20 | mm | 100 nm | 100 nm | $2 \times 10^5$ | 1 | 5 sec | 0.89% |
| Ex. 9 | One | 20 | mm | 100 nm | 100 nm | $2 \times 10^5$ | 1 | 5 sec | 1.24% |
| Comp. Ex. 5 | Not provided | 20 | mm | 100 nm | 100 nm | $2 \times 10^5$ | 1 | 5 sec | 3.88% |
| Ex. 10 | Two | 30 | mm | 100 nm | 100 nm | $3 \times 10^5$ | 1 | 5 sec | 1.35% |
| Ex. 11 | One | 30 | mm | 100 nm | 100 nm | $3 \times 10^5$ | 1 | 5 sec | 1.73% |
| Comp. Ex. 6 | Not provided | 30 | mm | 100 nm | 100 nm | $3 \times 10^5$ | 1 | 5 sec | 4.26% |
| Ex. 12 | Two | 10 | mm | 100 nm | 300 nm | $1 \times 10^5$ | 3 | 5 sec | 0.39% |
| Ex. 13 | One | 10 | mm | 100 nm | 300 nm | $1 \times 10^5$ | 3 | 5 sec | 0.44% |
| Comp. Ex. 7 | Not provided | 10 | mm | 100 nm | 300 nm | $1 \times 10^5$ | 3 | 5 sec | 2.27% |
| Ex. 14 | Two | 10 | mm | 100 nm | 600 nm | $1 \times 10^5$ | 6 | 5 sec | 1.25% |
| Ex. 15 | One | 10 | mm | 100 nm | 600 nm | $1 \times 10^5$ | 6 | 5 sec | 2.33% |
| Comp. Ex. 8 | Not provided | 10 | mm | 100 nm | 600 nm | $1 \times 10^5$ | 6 | 5 sec | 10.89% |

As is evident from Table 1 above, it was possible to make the rate of defects lower in Example 2, in which imprinting was carried out using the DTM mold structure with the one communicating concave portion, than in Comparative Example 1, in which imprinting was carried out using the DTM mold structure with no communicating concave portion; and it was possible to make the rate of defects even lower in Example 1, in which imprinting was carried out using the DTM mold structure with the two communicating concave portions.

It was possible to make the rate of defects lower in Example 4, in which imprinting was carried out using the DTM mold structure with the one communicating concave portion, than in Comparative Example 2, in which imprinting was carried out using the DTM mold structure with no communicating concave portion; and it was possible to make the rate of defects even lower in Example 3, in which imprinting was carried out using the DTM mold structure with the two communicating concave portions.

It was possible to make the rate of defects lower in Example 5, in which imprinting was carried out using the DTM mold structure with the one communicating concave portion, than in Comparative Example 3, in which imprinting was carried out using the DTM mold structure with no communicating concave portion.

It was possible to make the rate of defects lower in Example 7, in which imprinting was carried out using the DTM mold structure with the one communicating concave portion, than in Comparative Example 4, in which imprinting was carried out using the DTM mold structure with no communicating concave portion; and it was possible to make the rate of defects even lower in Example 6, in which imprinting was carried out using the DTM mold structure with the two communicating concave portions.

It was possible to make the rate of defects lower in Example 9, in which imprinting was carried out using the DTM mold structure with the one communicating concave portion, than in Comparative Example 5, in which imprinting was carried out using the DTM mold structure with no communicating concave portion; and it was possible to make the rate of defects even lower in Example 8, in which imprinting was carried out using the DTM mold structure with the two communicating concave portions.

It was possible to make the rate of defects lower in Example 11, in which imprinting was carried out using the DTM mold structure with the one communicating concave portion, than in Comparative Example 6, in which imprinting was carried out using the DTM mold structure with no communicating concave portion; and it was possible to make the rate of defects even lower in Example 10, in which imprinting was carried out using the DTM mold structure with the two communicating concave portions.

It was possible to make the rate of defects lower in Example 13, in which imprinting was carried out using the DTM mold structure with the one communicating concave portion, than in Comparative Example 7, in which imprinting was carried out using the DTM mold structure with no communicating concave portion; and it was possible to make the rate of defects even lower in Example 12, in which imprinting was carried out using the DTM mold structure with the two communicating concave portions.

It was possible to make the rate of defects lower in Example 15, in which imprinting was carried out using the DTM mold structure with the one communicating concave portion, than in Comparative Example 8, in which imprinting was carried out using the DTM mold structure with no communicating concave portion; and it was possible to make the rate of defects even lower in Example 14, in which imprinting was carried out using the DTM mold structure with the two communicating concave portions.

What is claimed is:

1. A mold structure used to produce a discrete track medium, comprising in a surface of the mold structure:
    a plurality of line pattern forming concave portions which are positioned so as to be adjacent and substantially parallel to each other; and
    a communicating concave portion which is positioned so as to intersect the line pattern forming concave portions and connects the line pattern forming concave portions,
    wherein X/Y is $1 \times 10^5$ or less and Z/Y is 5 or less, where X denotes the length of a line pattern forming concave portion with respect to a line direction from an end of the line pattern forming concave portion to an end of the communicating concave portion, the latter end being situated on the same side where the former end is situated, Y denotes the width of the line pattern forming concave portion, and Z denotes the depth of the line pattern forming concave portion.

2. The mold structure according to claim 1, wherein the communicating concave portion perpendicularly intersects one line pattern forming concave portion and another line pattern forming concave portion which are adjacent to each other, and connects these line pattern forming concave portions.

3. The mold structure according to claim 1, wherein the communicating concave portion connects at least one end of one line pattern forming concave portion with an end of another line pattern forming concave portion adjacent to the one line pattern forming concave portion, which faces the at least one end of the one line pattern forming concave portion.

4. A mold structure used to produce a discrete track medium, comprising in a surface of the mold structure:
a plurality of line pattern forming concave portions which are positioned so as to be adjacent and substantially parallel to each other; and
a communicating concave portion which is positioned so as to intersect the line pattern forming concave portions and connects the line pattern forming concave portions, wherein the communicating concave portion is provided in a plurality of places, and a line pattern forming concave portion is positioned so as to be sandwiched between the communicating concave portions which are adjacent to each other with respect to a line direction, and wherein $X/Y$ is $2\times10^5$ or less and $Z/Y$ is 5 or less, where X denotes the length of the line pattern forming concave portion with respect to the line direction from an end of one communicating concave portion to an end of another communicating concave portion, the former end being situated on the same side where the another communicating concave portion is situated and the latter end being situated on the same side where the one communicating concave portion is situated, Y denotes the width of the line pattern forming concave portion, and Z denotes the depth of the line pattern forming concave portion.

* * * * *